Jan. 7, 1936.  W. D. WRIGHT  2,027,261
BAG FILLING MACHINE
Filed Jan. 27, 1932  10 Sheets-Sheet 1
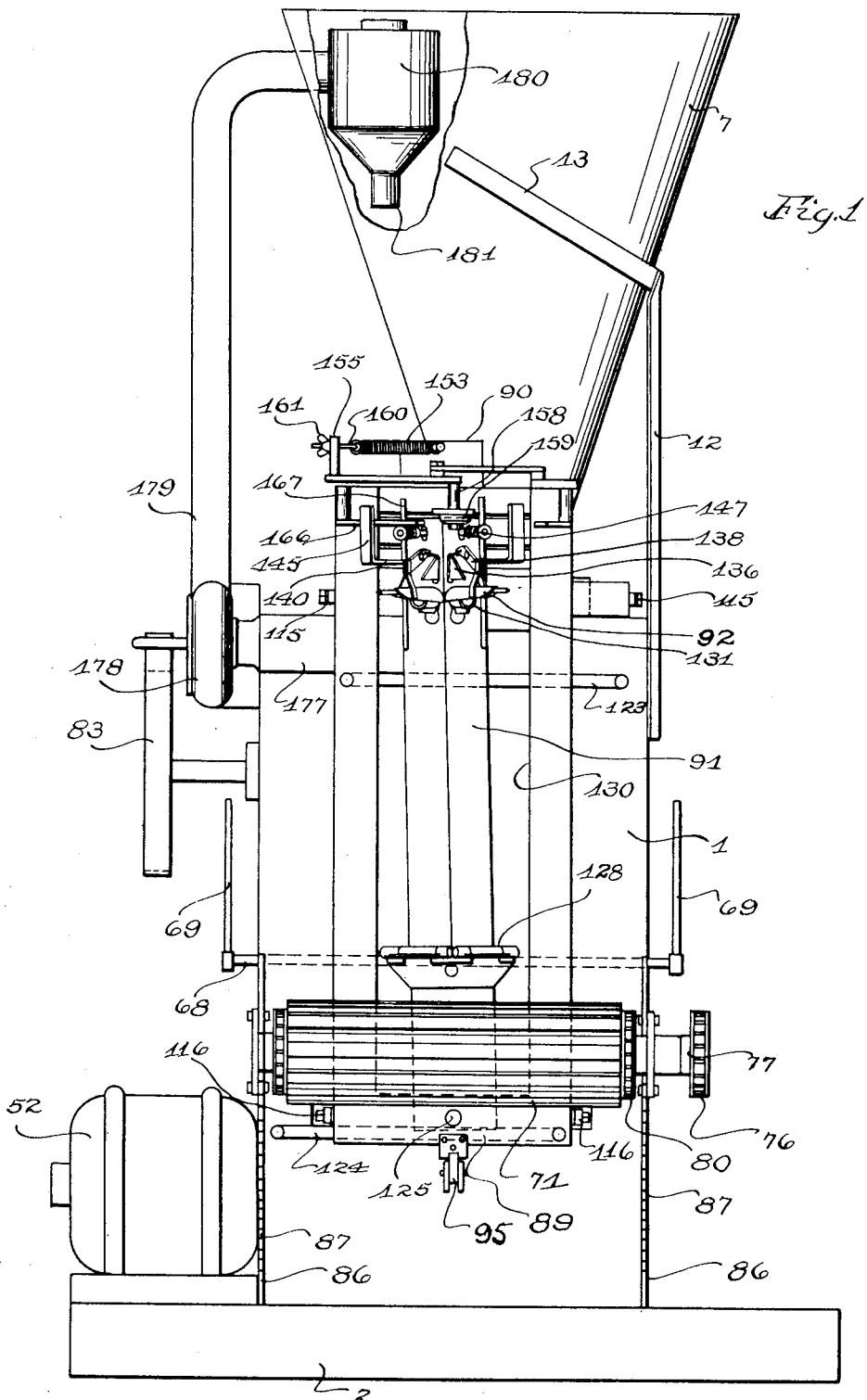
Fig.1
INVENTOR
William D. Wright
BY
His ATTORNEY Jan. 7, 1936.　　　W. D. WRIGHT　　　2,027,261
BAG FILLING MACHINE
Filed Jan. 27, 1932　　10 Sheets-Sheet 2
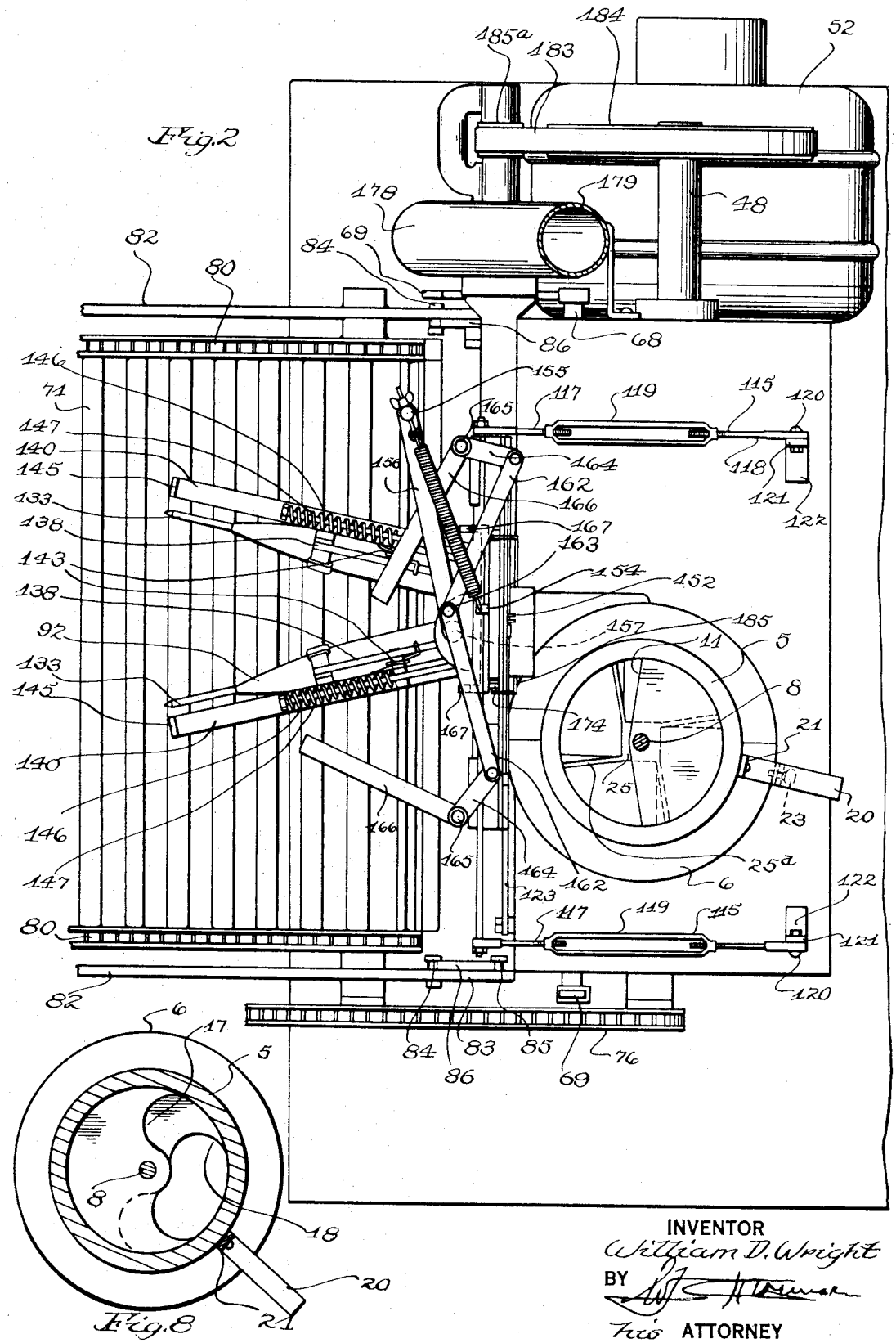
INVENTOR
William D. Wright
BY
ATTORNEY

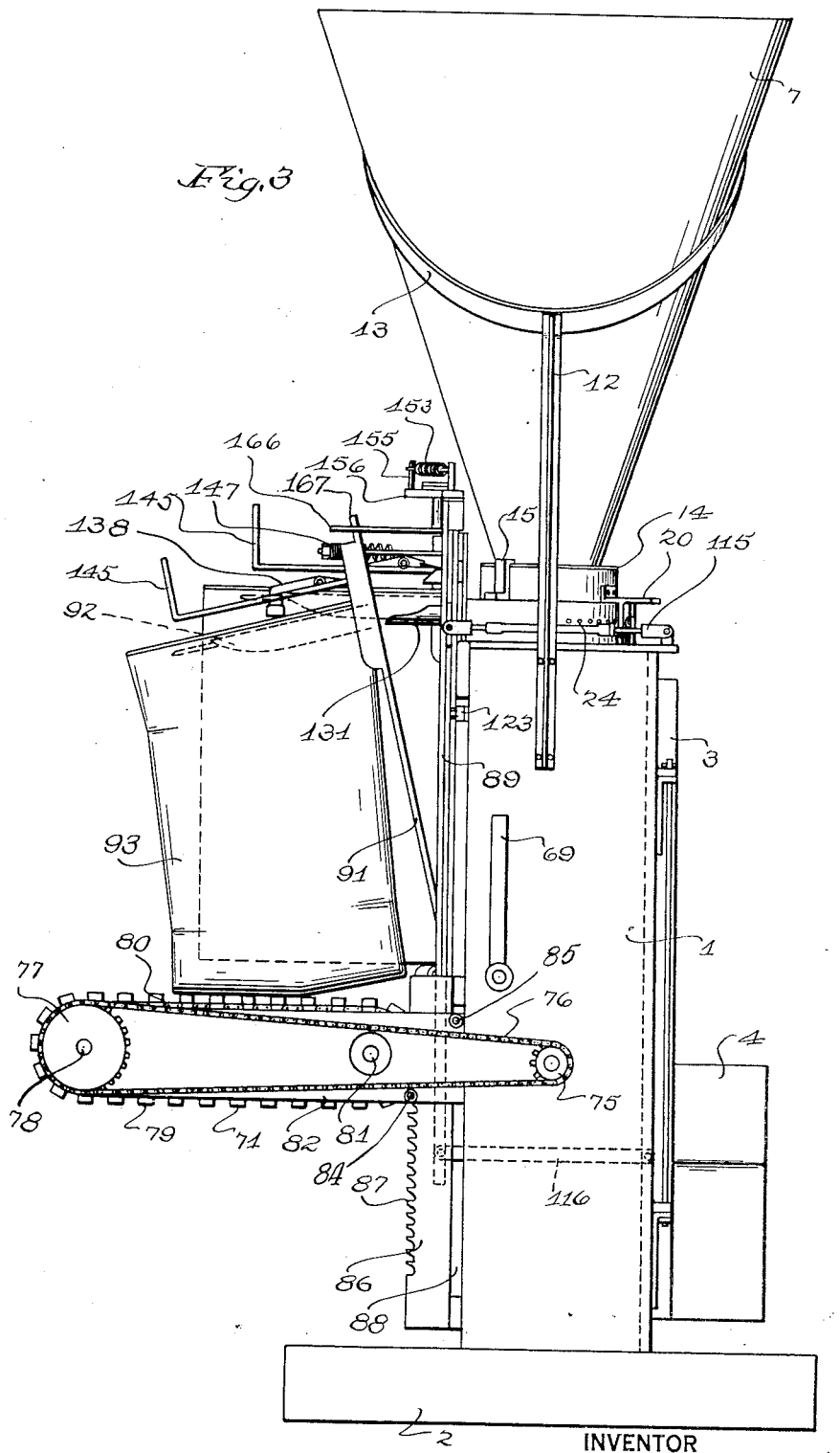

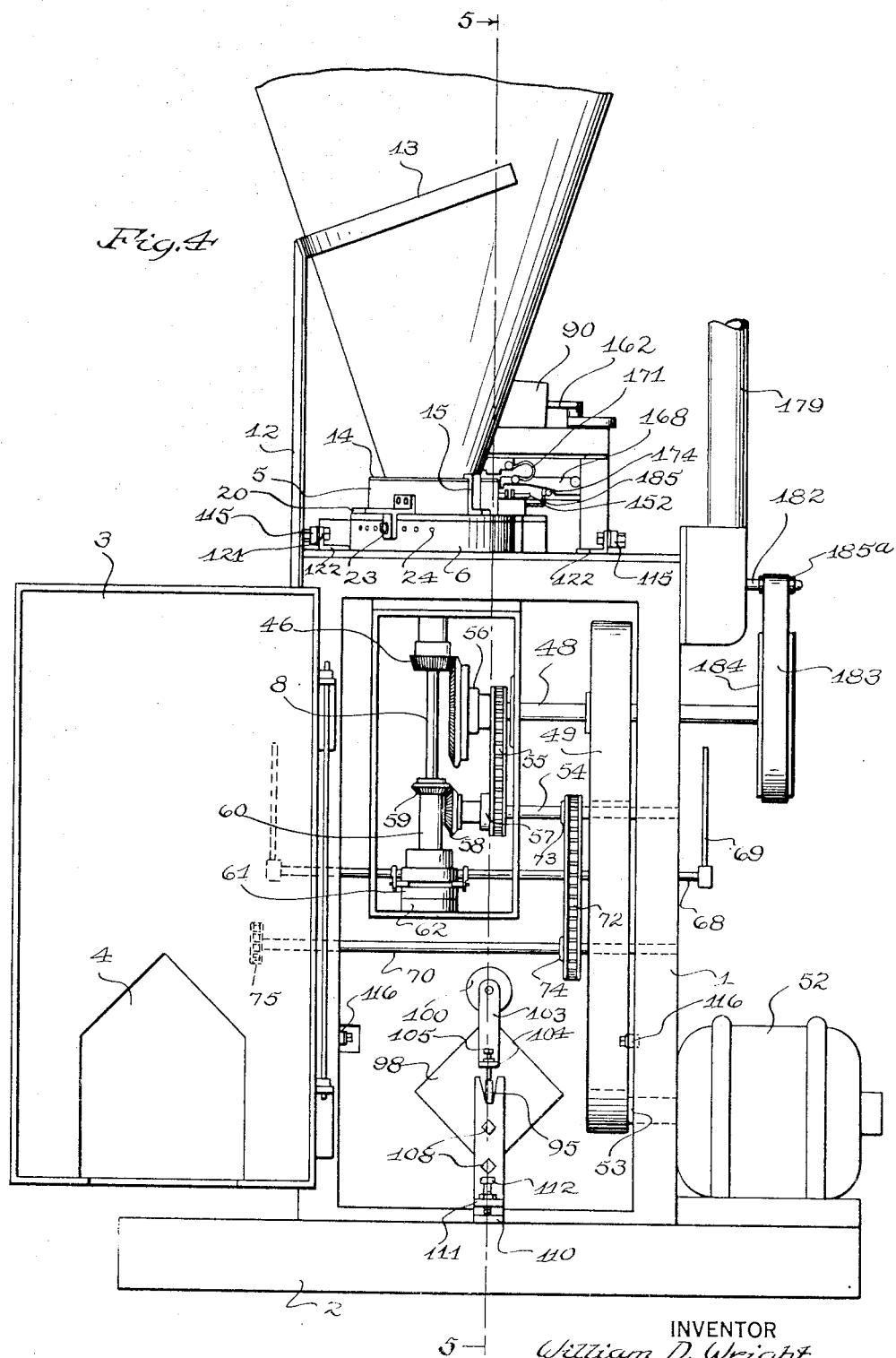

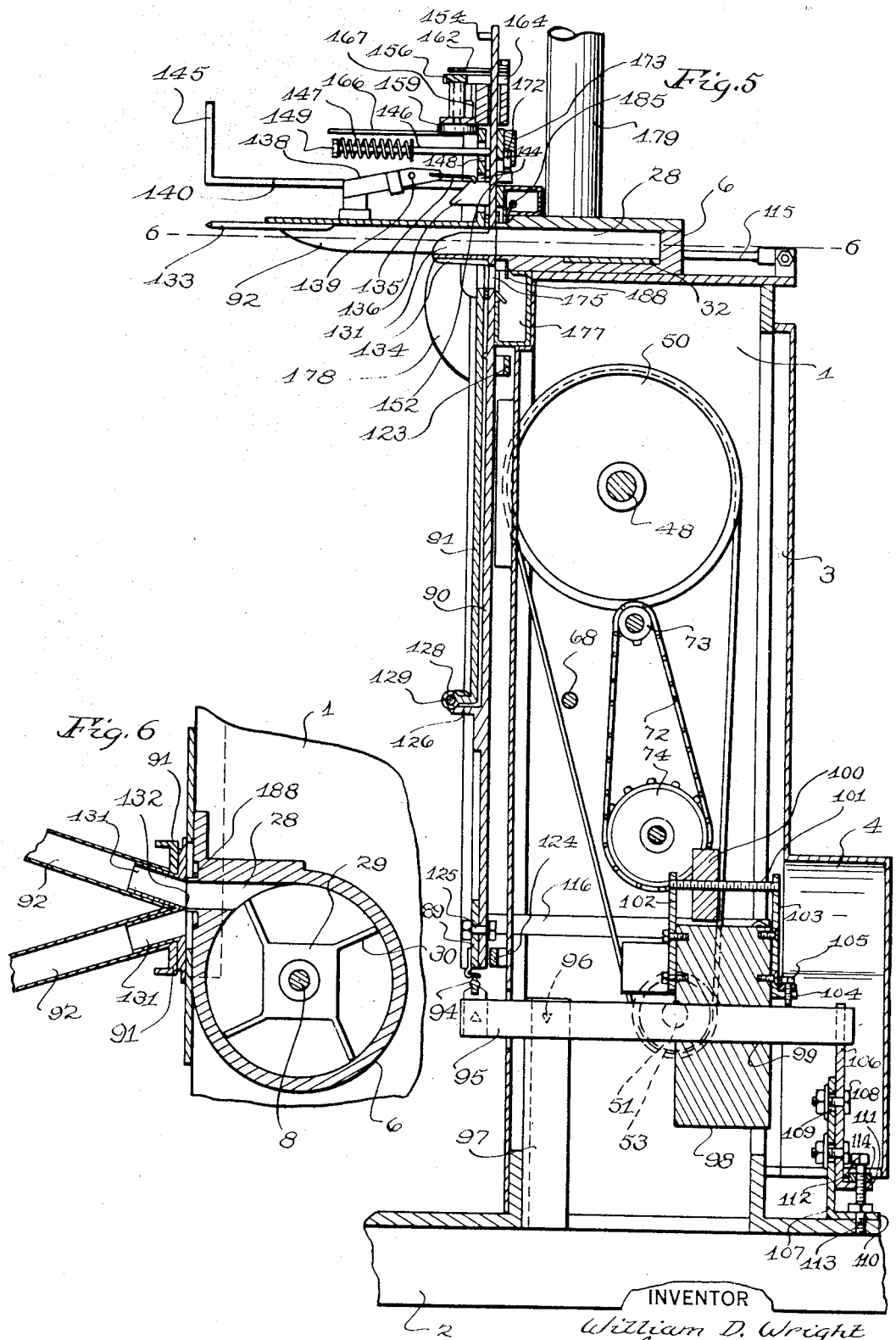

Jan. 7, 1936.   W. D. WRIGHT   2,027,261
BAG FILLING MACHINE
Filed Jan. 27, 1932   10 Sheets-Sheet 6

INVENTOR
William D. Wright
BY
His ATTORNEY

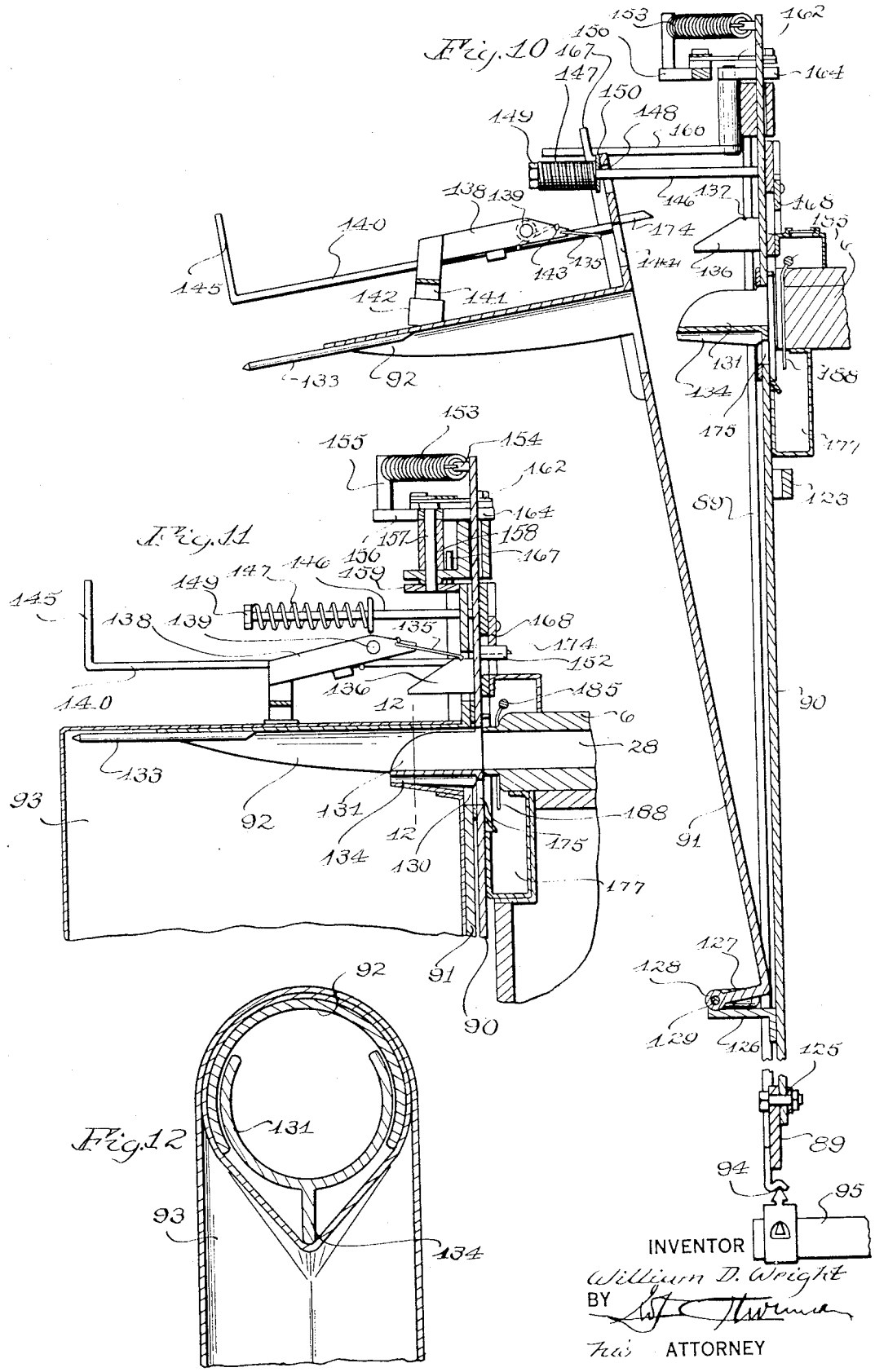

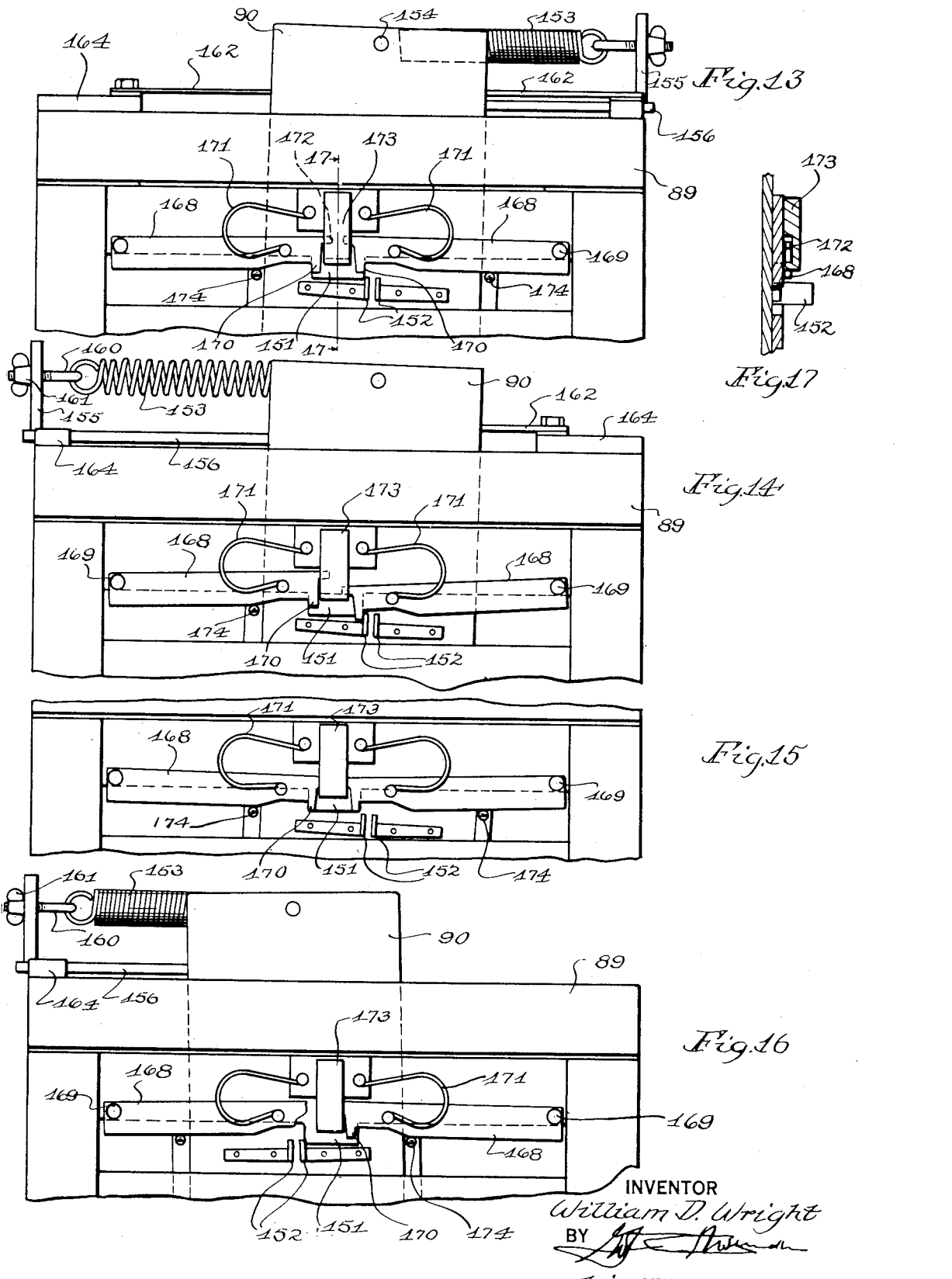

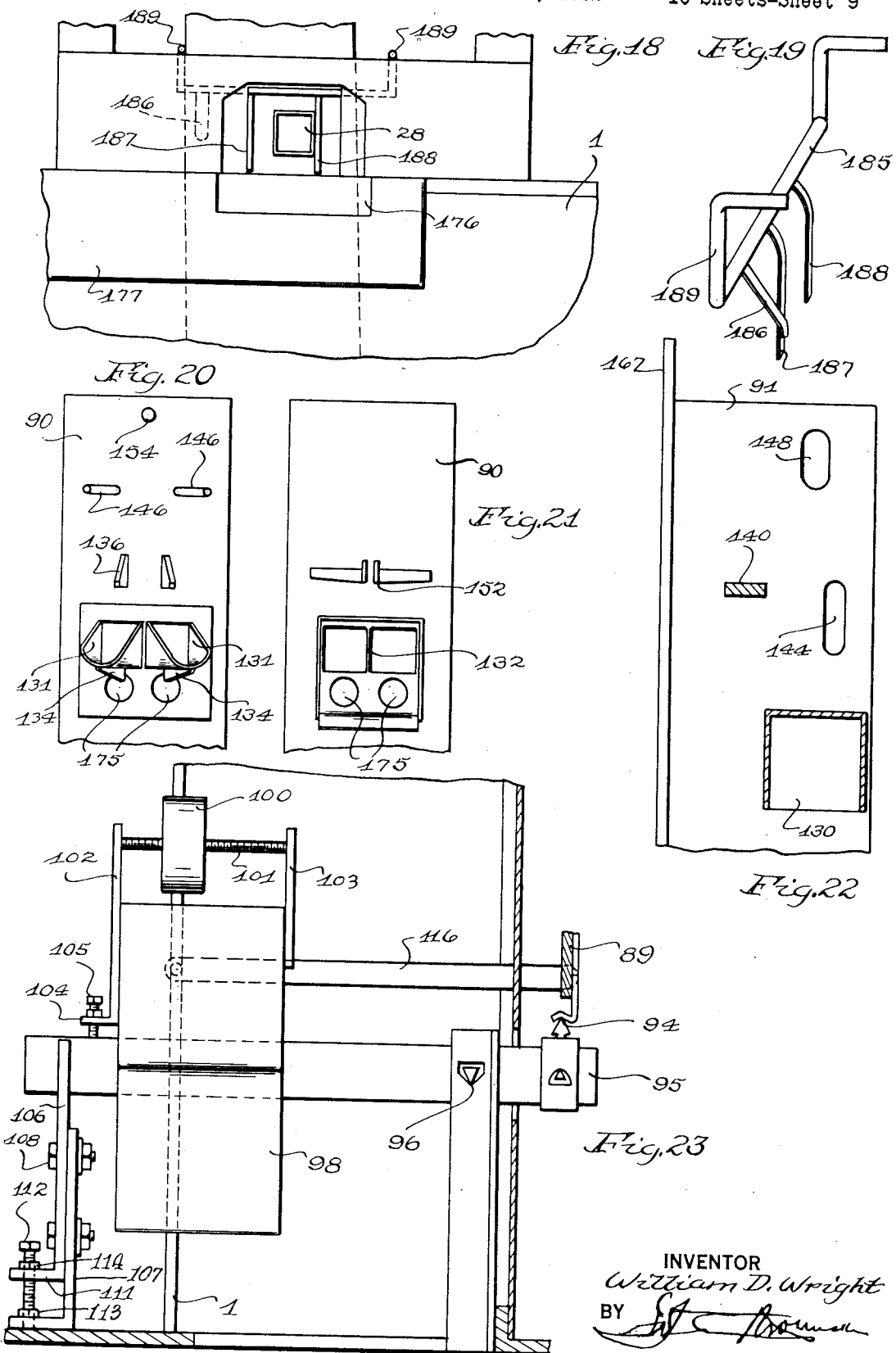

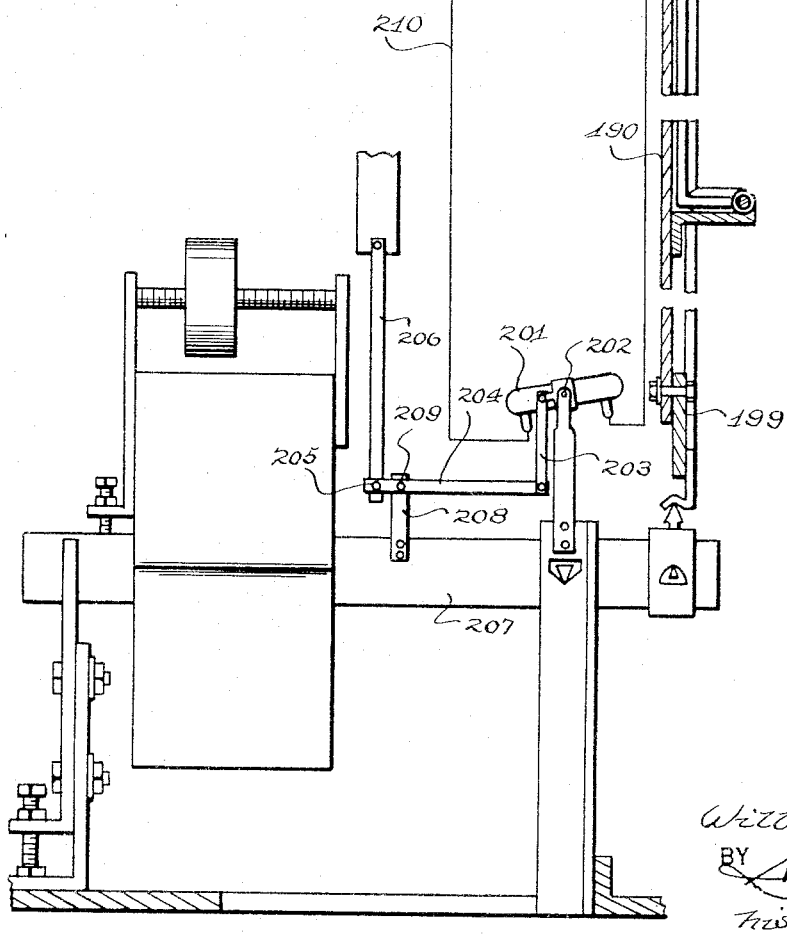

Patented Jan. 7, 1936

2,027,261

UNITED STATES PATENT OFFICE 2,027,261

BAG FILLING MACHINE

William D. Wright, Brockport, N. Y., assignor to Charles F. Robb, Jr., Webster, N. Y.

Application January 27, 1932, Serial No. 589,283

28 Claims. (Cl. 249—60)

The invention relates to a bag filling machine.

The object of the present invention is to improve the construction of bag filling and material weighing machines and to provide a simple, practical and efficient bag filling machine capable of producing a continuous uninterrupted and unobstructed flow of material from a hopper to the bag being filled and capable as soon as a bag has received its full charge or weight of material of automatically shifting the bag filling mechanism from such bag filling position to another bag filling position to enable the material to be discharged into an empty bag so that the filling of the latter may continue while the filled bag is being automatically removed from the machine.

Another object of the invention is to provide a bag filling machine equipped with a pair of bag carrying units automatically shiftable when a bag carried by one of the units has received its full charge or weight, to present the other bag carrying unit in bag filling position and adapted to enable an empty bag to be easily and quickly placed in position and the mechanism reset for automatic operation without interfering with the continuous operation of the material feeding mechanism or in any wise interrupting the free flow of the material therefrom.

Another object of the invention is to provide a bag filling machine adapted for filling valved bags and capable of effectually preventing the valve from accidentally closing during the filling operation and provided with a bag filling spout constructed to provide air passages between it and the walls of the valved opening to permit the air to escape or be exhausted freely from the bag, whereby pressure is prevented from building up within the bag and the filling capacity of the machine materially increased.

With these and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

In the drawings:

Figure 1 is a front elevation of a bag filling machine constructed in accordance with this invention.

Fig. 2 is a plan view of the same, the hopper being removed to illustrate more clearly the mechanism for automaticaly shifting the bag carrying units.

Fig. 3 is a side elevation of the bag filling machine.

Fig. 4 is a rear elevation of the bag filling machine, the hinged door being open.

Fig. 5 is a vertical longitudinal sectional view taken substantially on the line 5—5 of Fig. 4.

Fig. 6 is a horizontal sectional view taken substantially on the line 6—6 of Fig. 5, illustrating the construction of the rotary feeding impeller and the laterally shiftable spouts.

Fig. 8 is a horizontal sectional view taken substantially on the line 8—8 of Fig. 7 and illustrating the adjustable outlet of the upper rotary impeller.

Fig. 10 is an enlarged detail vertical sectional view taken longitudinally through one of the bag carrying units, the bag carrying unit being in its open or outer position.

Fig. 11 is a similar view, showing the bag carrying unit and a bag being clamped thereon in position for filling.

Fig. 12 is a detail sectional view taken substantially on the line 12—12 of Fig. 11.

Fig. 13 is an enlarged detail view illustrating the construction of the main and auxiliary catches, the main catch being in engagement with one of the lugs of the laterally shiftable support.

Fig. 14 is a similar view showing one of the auxiliary catches in engagement with the said lug.

Fig. 15 is a detail view of the main and auxiliary catches showing the same out of engagement with the spaced lugs of the laterally shiftable support.

Fig. 16 is a detail view similar to Fig. 13 but with the laterally shiftable support moved to the opposite side of the vertically movable frame and with the main catch in engagement with the other of the aforesaid pair of lugs.

Fig. 17 is a detail sectional view on the line 17—17 of Fig. 13.

Fig. 18 is a detail view illustrating the arrangement of the shiftable scraper.

Fig. 19 is a detail perspective view of the scraper.

Fig. 20 is a detail front elevation of the upper portion of the laterally shiftable support.

Fig. 21 is a detail rear elevation of the laterally movable shiftable support.

Fig. 22 is a detail view of the upper portion of one of the bag carrying units, the semi-tubular bag holder and the operating arm being in section.

Fig. 23 is an enlarged detail sectional view illustrating the construction of the weighing mechanism and the means for limiting the downward movement of the weighted end of the scale beam.

Fig. 24 is a vertical sectional view of a modification of the invention, illustrating an electrically operated main catch for holding the laterally shiftable support against movement.

Fig. 25 is a detail view of the upper portion of the laterally shiftable support shown in Fig. 24.

Figure 7:
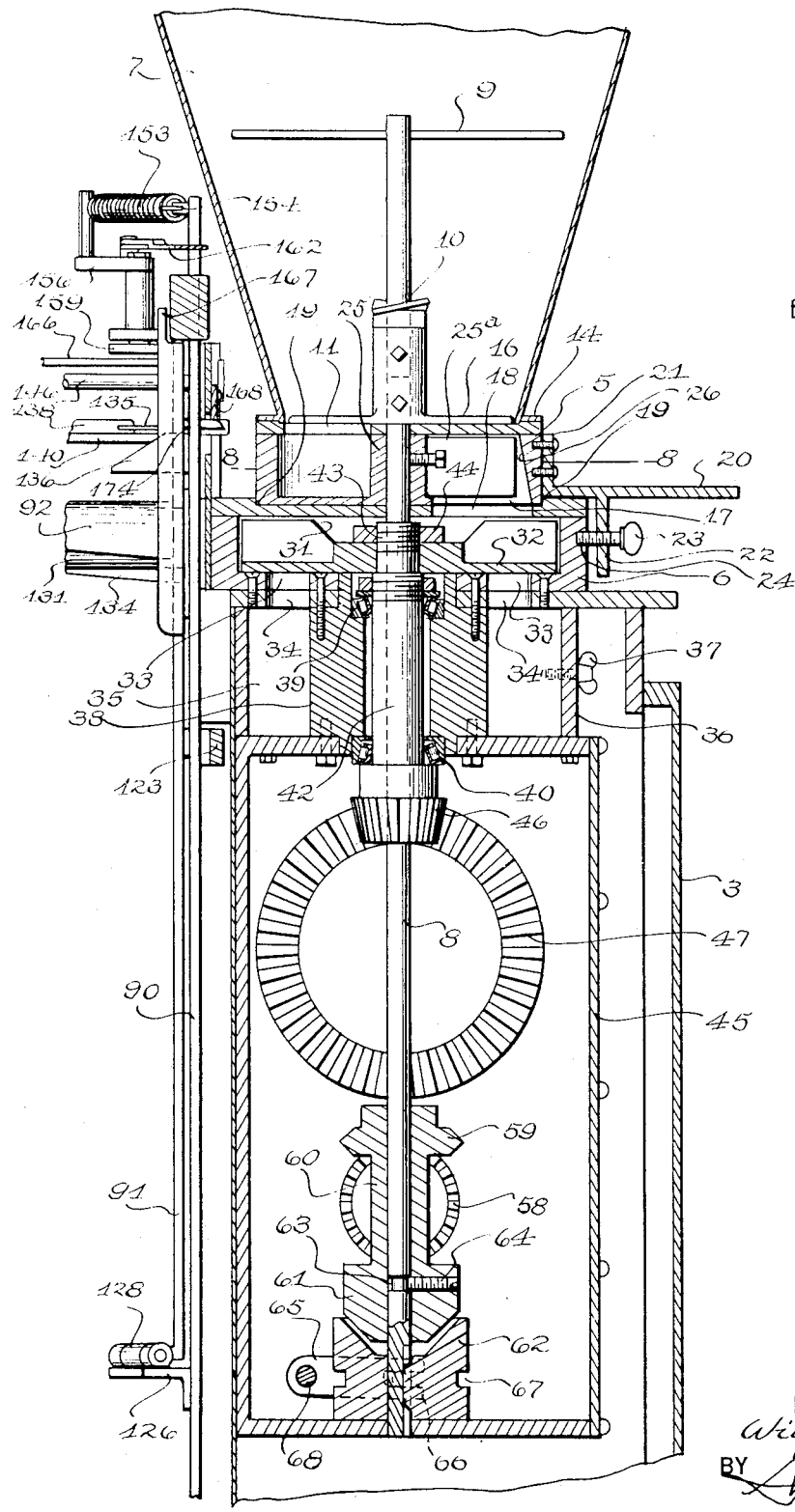
Fig. 7 is a vertical sectional view through the upper portion of the bag filling machine.

In the accompanying drawings, in which is illustrated the preferred embodiment of the invention, the weighing machine comprises in its construction a main frame 1 having a supporting base 2 and preferably constructed in the form of a substantially rectangular casing provided at the back with a hinged door 3 adapted to afford access to the mechanism arranged interiorly of the casing of the main frame. The lower portion of the door is provided with a hollow extension 4 which houses the rear portion of the weighing mechanism hereinafter described. The frame and the casing thereof may, of course, be constructed of any suitable material. Mounted upon the top of the casing are upper and lower impeller casings 5 and 6 and a hopper 7 through which extends a vertical shaft 8 carrying at its upper portion agitator arms 9 and 10 located within the hopper and adapted to agitate the material therein to prevent caking, bridging or arching of the material and to facilitate the feeding of the same through an inlet opening 11 in the top wall of the upper impeller casing 5. The hopper 7, which is mounted upon the upper impeller casing, is preferably of inverted truncoconical formation and is arranged within a support consisting of a vertical standard 12 and curved arms 13 extending from the upper end of the standard in opposite directions and arranged at an inclination and embracing the hopper at one side thereof and partially encircling the same, as clearly illustrated in Fig. 3 of the drawings. The lower portion of the standard 12 is suitably secured to the main frame of the machine and is arranged exteriorly of the casing of the same. The hopper is preferably flanged at the bottom at 14 and is retained on the upper impeller casing by suitable clamps 15, but any other suitable means may, of course, be employed for mounting the hopper in position above the upper impeller casing for supplying material to the same.

The agitator arms 9 and 10 are located above the bottom of the hopper, and the shaft 8 also carries horizontal rotating arms 16 located at the upper face of the top wall of the upper impeller casing and operating as a scraper to assist in causing the material to pass through the inlet opening 11 of the upper impeller casing.

The upper impeller casing, which is cylindrical, is provided in its bottom with an outlet opening 17 communicating with the lower impeller casing and located diametrically opposite the inlet opening 11. The body portion of the upper impeller casing is cylindrical and is adjustable to change the position of the outlet 17 with respect to the upper inlet opening 18 of the lower impeller casing. This will vary the size of the passage between the upper and lower impeller casings. The cylindrical body portion of the upper impeller portion is arranged in a seat 19 in the top wall of the lower impeller casing and is adapted to be partially rotated by an operating arm 20 provided at its inner end with an attaching portion 21 secured to the cylindrical body portion of the upper impeller casing exteriorly thereof. The operating arm is provided with a depending flange or portion 22 having a thumb screw 23 or other adjustable means for engaging an arcuate series of sockets 24 provided in the vertical wall of the lower impeller casing for enabling the body portion of the upper impeller casing to be secured in its rotary adjustment. By adjusting the operating arm 20 the size of the passage between the upper and lower impeller casings may be varied to suit the character of the material operated on by the bag filling machine.

Figure 9:
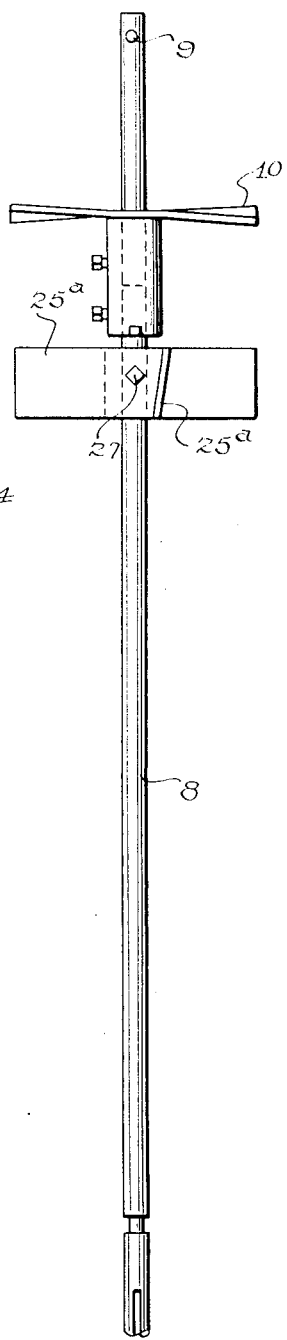
Fig. 9 is a detail elevation of the vertical shaft of the upper impeller and agitator of the hopper.

The upper rotary impeller 25 consists of a hub and approximately tangentially disposed blades 25a which are set at an angle or inclination, as clearly illustrated in Fig. 9 of the drawings, to enable them to sweep the material through the passage between the upper and lower impeller casings and to exert a downward pressure on the material. The cylindrical wall of the upper impeller casing is interiorly inclined at 26 and extends upwardly and inwardly from the outer wall of the opening in the bottom of the upper impeller casing, as clearly shown in Fig. 7 of the drawings, to assist in feeding the material downwardly from the upper impeller casing. The upper rotary impeller is clamped to the vertical shaft 8 by a screw 27 or other suitable fastening means and the shaft 8 forms the pivot on which the cylindrical body portion of the upper impeller casing turns in its rotary adjustment.

The lower impeller casing, which is cylindrical, is provided at the front with a discharge outlet 28 and the lower rotary impeller 29 consists of a central hub portion and approximately tangentially arranged blades 30 which extend above the plane of the upper face of the hub and have their inner ends beveled or cut away at 31 adjacent the said upper face of the hub, as clearly shown in Fig. 7 of the drawings. The blades 30 of the lower rotary impeller discharge or feed the material through the discharge opening 28. The said blades 30 are connected at the bottom by an integral disk 32 constituting a bottom for the lower rotary impeller and cooperating with the blades 30 to form pockets open at the top and closed at the bottom for carrying the material to the discharge outlet 28. The said pockets of the lower rotary impeller are closed at the periphery of the impeller by the cylindrical wall of the impeller casing 6.

The bottom of the lower impeller casing is provided with opposite openings 33 which are located above registering openings 34 of an air tight dust box 35 within the main frame of the machine and arranged immediately below the lower impeller casing, as clearly shown in Fig. 7 of the drawings. The dust box forms an air tight dust chamber for collecting dust accumulating below the lower rotary impeller and assists in maintaining the lower impeller casing free from such dust. The dust box is provided at the back of the machine with a removable plate 36 constituting the rear wall of the dust box and secured to each of the side walls by a screw 37 or other suitable fastening means for enabling the rear wall or plate to be readily removed for cleaning the dust box. Access may be readily had to the removable plate 36 through the rear door 3 of the casing of the main frame of the machine.

Within the dust chamber is arranged a central cylindrical bearing member 38 provided with a central opening and having upper and lower roller bearings 39 and 40 within which is arranged a tubular shaft 42 to which the lower rotary impeller is secured. The upper terminal portion 43 of the tubular shaft is reduced and threaded to receive a nut 44 which clamps the lower rotary impeller on the tubular shaft and against the shoulder formed by the reduction of the upper portion of the said tubular shaft. While roller bearings 39 and 40 are provided for the upper and lower portions of the tubular shaft 42, any other suitable bearings may, of course, be provided for mounting the tubular shaft through which passes the vertical shaft 8. No claim is made in the present application to the feeding mechanism per se as this forms the subject matter of Patent No. 1,983,427, dated December 4, 1934, a division of the present application.

The gearing for rotating the upper and lower impellers is mounted within a hanger 45 which depends within the upper portion of the main frame of the machine, being preferably secured to the bearing member 38, but it may be mounted in any desired manner, and the central vertical shaft 8 extends from the hopper to the bottom of the hanger, and the lower end of the tubular shaft 42, which terminates at the upper portion of the hanger, has suitably fixed to it a horizontal bevel pinion 46 which meshes with a vertical ring gear wheel 47 fixed to an upper horizontal shaft 48 which is connected by a belt 49 and suitable pulleys 50 and 51 with an electric motor 52 mounted on the base of the machine exteriorly of the casing of the main frame, as clearly illustrated in Fig. 4 of the drawings. The pulley 51 of the motor shaft 53 is relatively small and the pulley 50 of the upper horizontal shaft 48 is relatively large to secure the desired reduction in speed, but any other desired form of gearing may, of course, be employed for transmitting motion from the electric motor to the machine.

The gears 46 and 47 are preferably bevel gears, and the upper shaft 48 is connected with an intermediate horizontal shaft 54 by a sprocket gearing consisting of a sprocket chain 55, an upper sprocket pinion 56 and a lower sprocket wheel 57 mounted respectively on the shafts 48 and 54. The intermediate horizontal shaft is connected at its inner end by bevel gears 58 and 59 with a rotary sleeve 60 arranged on the shaft 8 and provided at its upper end with the said bevel gear 59, and at its lower end with a clutch member 61 which cooperates with a slidable clutch member 62 keyed to the lower end portion of the vertical shaft 8 and adapted to engage the clutch member 61 for clutching the shaft 8 to the sleeve 60 of the gear 59.

When the motor is running, motion is transmitted through the aforesaid gearing to the tubular shaft 42 upon which the lower rotary impeller is mounted, and the said lower rotary impeller is continuously operated while the said motor is in operation. This will enable the lower rotary impeller to clear itself of material after the feed of material from the hopper to the lower impeller casing is cut off by unclutching the shaft 8 to which the upper rotary impeller is fixed. When the clutch members 61 and 62 are engaged, both shafts 8 and 42 will be rotated and both impellers will be operated. The shaft 8 is provided at the clutch member 61 with an annular groove 63 into which extends the inner end of a screw 64 or other suitable fastening means mounted on the clutch member 61 and adapted to hold the clutch member and the associated gear 59 against movement longitudinally of the shaft 8 while permitting free independent rotation of the gear 59 and the clutch member 61 when the clutch member 62 is moved out of engagement with the clutch member 61. The slidable clutch member 62 is operated by means of a suitable clutch shifter preferably composed of spaced oscillatory arms 65 located at opposite sides of the slidable clutch member and provided at their free terminals with fingers 66 which extend into an annular groove 67 of the slidable clutch member. The arms 65 are carried by a transverse rock shaft 68 journaled in suitable bearings in the frame of the machine and provided at each end with an operating handle 69 to enable the clutch to be operated from either side of the machine.

The intermediate shaft 54 is connected by sprocket gearing with a lower horizontal shaft 70 which operates an endless carrier 71. The sprocket gearing for connecting the shafts 54 and 70 comprises a sprocket chain 72, an upper sprocket pinion 73 and a lower sprocket wheel 74. The lower horizontal shaft 70 extends beyond one side of the frame of the machine and carries a sprocket pinion 75 which is connected by a sprocket chain 76 with a sprocket wheel 77 mounted on one end of a front transversely disposed conveyor shaft 78. The endless conveyor 71 comprises a belt or apron composed of spaced slats 79 carried by side chains 80 which are arranged on the suitable sprocket wheels mounted on the front transverse conveyor shaft 78 and on a rear transverse conveyor shaft 81. When the motor is running motion is transmitted through the aforesaid gearing to the endless conveyor 71 which is continuously operated during the operation of the motor. The endless conveyor 71, which is horizontally disposed, constitutes a bag receiving platform and is adapted to carry a filled bag outwardly from the bag filling mechanism as hereinafter fully described. This conveyor is mounted in a vertically adjustable frame 82 comprising spaced sides and suitable transverse connecting portions, the sides being provided with rear extensions 83 having spaced headed fastening devices 84 and 85 constituting lugs and engaging spaced vertical standards 86 located at opposite sides of the front portion of the machine and provided at their front edges with a vertical series of shouldered teeth 87 adapted to be engaged by the lugs 84 which are located in advance of the lugs 85. The standards 86, which are spaced from the front of the casing of the machine to provide intervening spaces 88 to receive the rear headed lugs 85, have their rear ends engaged by the lugs 85. The rear edges of the standards 86 are smooth and the rear lugs are located adjacent the upper edges of the sides of the conveyor frame while the front lugs are located adjacent the lower edges of the sides of the conveyor frame. By this arrangement the weight of the conveyor frame will maintain the lugs securely and firmly in engagement with the standards in the vertical adjustment of the conveyor. The interlocking connection between the conveyor and the frame will enable the conveyor to be raised and lowered to adapt the machine for handling bags of different lengths.

The chain 76, which is connected with and actuates the endless conveyor, is composed of separable lengths and is adapted to be lengthened or shortened by adding or removing links to adapt the length of the sprocket chain to the vertical adjustment of the endless conveyor.

The bag holding mechanism comprises in its construction a vertically movable weighing frame 89, a laterally shiftable support 90 and a pair of bag carrying units 91 having bag holders 92 adapted to receive and support a bag or bags 93. The weighing frame, which is movable vertically, is supported at the center of its lower end of a knife edge bearing 94 of a scale beam 95 fulcrumed intermediate of its ends at 96 on suitable knife edge bearings of a supporting standard 97 to form front and rear arms, the rear arm being of greater length than the front arm and carrying an adjustable weight 98. The supporting standard is preferably composed of spaced sides connected at the top and providing an intervening space between its sides to receive the scale beam. The weight 98 is provided with an opening 99 through which the rear arm of the scale beam passes, and the weight is slidable along the rear arm for setting the weighing mechanism to suit requirements, and it is also provided with a supplemental weight 100 mounted on a horizontally disposed fixed screw 101 for affording a final accurate adjustment of the weight of the scale beam. The screw is mounted between upwardly projecting arms 102 and 103 secured to the front and rear faces of the weight, and the rear arm 103 is provided with a rearwardly projecting flange 104 in which is mounted a screw 105 arranged to engage the upward edge of the scale beam for clamping the main weight 98 in its adjustment.

The scale beam is limited in its movement to provide the desired vertical movement of the weighing frame by means of a rear adjustable support and stop consisting of a vertical standard composed of upper and lower approximately L-shaped sections 106 and 107 fitted against each other and adjustably secured together by bolts 108 mounted on one of the sections and extending through enlarged perforations or openings 109 in the other section. The lower standard 107 has its angularly related portion 110 secured to the base of the machine and the angularly related portion 111 of the upper section 106 carries a vertical screw 112 threaded into the angular portion 111 and arranged to bear against the head of a screw 113 or other means for securing the lower section of the standard to the base of the machine. The upper section of the standard is first adjusted to permit the desired movement of the scale beam and the weighing frame, and the screw 112 is then adjusted to lock the upper section 106 of the standard in its adjustment to prevent any accidental downward movement of the said upper section of the standard incident to the scale beam dropping upon the said upper section 106. A lock nut 114 is mounted on the screw 112 for engaging the angularly related portion of the upper section of the standard to prevent the adjusting screw from being jarred loose by the blows incident to the stopping of the rear arm of the scale beam in its downward movement. The extension or housing 4, which is formed integral with the rear door 3 of the casing, receives the rear end of the scale beam, and the standard which limits the downward movement of the same.

The vertically movable weighing frame 89 is guided and maintained in its vertical movement by upper and lower pairs of longitudinal links 115 and 116 located at the upper and lower portions of the vertically movable weighing frame at opposite sides thereof and pivotally connected with the said weighing frame and with the main frame of the machine. The upper links 115, which are located at the top of the casing of the machine, are composed of front and rear sections 117 and 118 connected by a turnbuckle 119 to permit an adjustment of the said links. The rear ends of the links 115 are pivotally connected by bolts 120 to lugs 121 preferably formed by L-shaped plates 122 secured to the top of the casing and extending upwardly therefrom as clearly illustrated in Figs. 2 and 4 of the drawings. The lower links 116 preferably consist of bars, as clearly illustrated in Figs. 3 and 5 of the drawings, the adjustment being provided in the upper links to enable the weighing frame to be accurately maintained in a vertical position. Lateral movement of the vertically movable weighing frame is limited by upper and lower transversely disposed links 123 and 124 preferably consisting of rods, the upper link 123 being pivoted to the main frame at one side of the machine and to the vertically movable frame at the other side of the machine. The lower link is reversely arranged, being pivotally connected to the main frame of the machine at the same side of the machine as the end of the upper link, which is pivotally connected to the vertically movable frame. The other end of the link is pivotally connected to the vertically movable frame at the side of the frame at which the upper link is pivotally connected to the main frame. The pairs of upper and lower longitudinal links and the pair of transversely disposed links maintain a floating connection between the weighing frame and the main frame and insure a substantially vertical movement of the weighing frame through the action of the scale beam by preventing any material lateral movement of the vertically movable weighing frame.

The weighing frame, which may be of any desired form, is preferably approximately oblong and composed of spaced sides and connecting top and bottom portions and the laterally shiftable support 90, which may be conveniently formed of an oblong plate or member, is pivoted at the center of its lower end to the lower end of the weighing frame at the center thereof by a pivot bolt 125 or other suitable means, and the said support, which is located at the space between the sides of the weighing frame, is shiftable laterally by the means hereinafter described, to present first one of the said pair of bags to the discharge outlet 28 and then the other bag after the first bag has been filled and received its full charge of material. The laterally shiftable support 90 is provided at its lower portion with a forwardly projecting approximately L-shaped bearing bracket 126 rigidly mounted on the said laterally shiftable support and projecting horizontally therefrom and having hinged to it adjacent its outer edge the lower ends of the bag carrying units 91.

The bag carrying units are provided at their lower ends with arms 127 arranged at right angles to the body portion of the bag carrying units and provided at their outer ends with eyes 128 receiving pintles 129 for hinging the bag carrying units to the supporting brackets of the laterally shiftable frame. The bag carrying units have their pintles arranged at an angle to enable the bag carrying units to swing forwardly and laterally in the direction of the bag holders 92 which diverge forwardly or outwardly, as clearly illustrated in Fig. 2 of the drawings. The body portion of each bag carrying unit consists of a plate or bar bent at right angles at its lower end to form the said arm 127 and provided at its upper portion with a rectangular opening 130 around the top and sides of which is secured the inner end of the bag holder 92 which tapers outwardly. The bag holder 92 is approximately semi-tubular to fit over a cooperating spout 131 of the laterally shiftable support. The laterally shiftable support is provided at its upper portion with a pair of the spouts 131 which diverge outwardly, as clearly illustrated in Figs. 6 and 20 of the drawings, and their adjacent walls converge inwardly and form a knife edge at 132 at the discharge outlet 28 of the lower rotary impeller. This will enable the spouts to be shifted back and forth from the discharge outlet 28 without interfering with or in any wise obstructing or interrupting the steady flow of material from the discharge spout as the material without obstruction will be discharged into either or both of the spouts 131. The semi-tubular bag holders fit over the spouts 131 which are of semi-tubular formation, but open at the top, as shown, and the arrangement of the semi-tubular bag holders over the semi-tubular spouts form a tubular passage for the material as the same is discharged from the outlet 28 and delivered to the bags.

The bag holders are provided at their outer ends with fixed rods 133 extending outwardly from the ends of the tapered bag holders longitudinally of the same and adapted to readily enter the bags and support the outer portions thereof, as clearly illustrated in Fig. 11 of the drawings.

The bags which are filled are of the usual construction, having a valved opening at one corner. The bag holder which extends into the bag maintains the valve open and each spout is provided at the bottom with a tapering fin 134 extending longitudinally of the spout and adapted to maintain the bottom wall of the valved opening in a distended or stretched position to provide air passages at opposite sides of the said fin, as clearly illustrated in Fig. 12 of the drawings. This will prevent pressure from building up within the bags and will materially increase the filling capacity of the machine as the fin will prevent the material delivered to the bags from closing the valve prematurely and until each bag has received its full charge or weight. The fin tapers outwardly, as clearly shown in Fig. 11, and the said spouts diverge from rectangular passages through the laterally shiftable support.

When a bag receives its full charge, the vertically movable weighing frame moves downwardly and the laterally shiftable support 90 moves laterally to carry one bag carrying unit from behind the roller 159 and to carry the other bag carrying unit behind the said roller 159, and the bag carrying unit 91 having the full bag swings forwardly or outwardly from the position illustrated in full lines in Fig. 5 of the drawings to that illustrated in Figs. 3 and 10 of the drawings.

After a bag has been removed and the bag carrying unit 91 has received an empty bag, it is moved inwardly by hand and is retained by a spring catch 135 at the limit of its inward movement in position to be carried behind the roller 159 by the lateral movement of the shiftable support 90. The spring catch 135 engages a keeper lug 136 fixed to the laterally shiftable support and provided at the top with a notch 137 and having a beveled nose in advance of the notch 137, as clearly illustrated in Fig. 10 of the drawings. The laterally shiftable support is provided with a pair of the keeper lugs 136 which diverge forwardly, as clearly illustrated in Fig. 20 of the drawings, to correspond with the outwardly diverging positions of the bag holders. The catch 135 consists of a leaf spring provided with an engaging portion to coact with the notch 137 and it is carried by the inner or rear end of a longitudinally disposed lever 138 fulcrumed intermediate of its ends by a pivot 139 on an operating arm 140 rigidly secured to the body portion of the bag carrying unit and located above and slightly to one side of the bag holders. The lever 138 has the rear catch carrying arm and a front clamping arm provided with a depending angularly related portion 141 having a clamping head 142 which is maintained in engagement with a bag by a spring 143 and also by the action of the spring catch when the bag carrying unit is moved inwardly from the position shown in Fig. 10 of the drawings to the closed position illustrated in Fig. 5. Each bag carrying unit is provided above the bag holder with an opening 144 through which the beveled keeper lug 136 projects when the bag carrying unit is closed, as shown in Fig. 5 of the drawings. An empty bag is placed in position on the bag holder when the bag carrying unit is in its open position at the limit of its outward movement, as illustrated in Fig. 3 of the drawings.

When the bag carrying unit is closed the catch 135 rides up the beveled nose of the lug 136 and engages the notch 137 to secure the bag carrying unit in its closed position, and at the same time, pressure is applied to the bag through the lever 138 by reason of the engagement of the spring catch 135 of the lever 138 with the said keeper lug. The weight of a bag after receiving its full charge of material is sufficient to disengage the catch 135 from the lug 137 and cause the bag carrying unit having the filled bag to swing outwardly automatically to the position illustrated in Fig. 10 of the drawings after the bag carrying unit 91 has been moved from behind the roller 159 by the lateral movement of the shiftable support 90. This will lower the filled bag to the endless conveyor which will carry the bag outwardly and strip the same from the bag holder. The spring 143 consists of a coil having one end extended and connected with the lever and its other end extended and connected with the operating arm 140 of the bag carrying unit. The operating arm 140 is provided at its outer end with a grip 145 extending upwardly from the arm 140 at right angles thereto and adapted to be readily grasped by the operator for moving the bag carrying unit inwardly after an empty bag has been placed on the bag holder.

Each bag carrying unit is guided at its upper portion in its outward movement by a horizontal rod 146 and is cushioned by a coiled spring 147. The rods 146 are rigidly secured at their inner ends to the laterally shiftable support and diverge forwardly or outwardly therefrom and extend through openings 148 at the upper ends of the bag carrying units.

The coiled springs 147 which are disposed on the outer portions of the guide rods are retained thereon by nuts 149 or other suitable means, and washers 150 are preferably arranged on the guide rods 146 at the inner ends of the springs 147 for engagement by the bag carrying units.

The upward and downward movement of the weighing frame carries the laterally shiftable support into and out of engagement with a centrally arranged fixed catch of the main frame for holding the laterally movable frame first in one bag filling position and then the other bag filling position. This main catch preferably consists of a fixed lug 151 which is adapted, as illustrated in Fig. 13 of the drawings, to be engaged by one of a pair of projecting lugs 152 carried by the laterally shiftable support and in the next operation of the machine to engage the other of the spaced lugs 152, as illustrated in Fig. 16 of the drawings. When one of the lugs 152 of the laterally shiftable support is in engagement with the fixed lug 151 of the main frame, as illustrated in Fig. 13, the weighing frame is at the limit of its upward movement and the said laterally shiftable support is in one of its bag filling positions. When the weighing frame moves downwardly under the action of a full bag the engaged lug 152 is carried downwardly out of engagement with the fixed lug of the main frame and the laterally shiftable support is shifted automatically under the influence of the weight of the full bag and a spring 153 to its other bag filling position, and when the weighing frame moves upwardly the other of the said lugs 152 is brought into engagement with the fixed lug 151 of the main frame, as illustrated in Fig. 16 of the drawings.

The coiled spring 153 is secured at its inner end to a lug or projection 154 located at the center of the top portion of the laterally shiftable support and the outer end of the spring is adjustably connected to an upstanding pin 155 of a horizontally swinging arm or lever 156 pivotally mounted on a vertical spindle or pivot 157 journaled in a suitable bearing 158 at the top of the main frame and carrying at its lower end a disk 159 which forms a stop for preventing the outward movement of one of the bag carrying units when the same is in rear of the said disk 159, as clearly illustrated in Fig. 1 of the drawings. The disk 159 which is located in advance of the upper ends of the body portions of the bag carrying units also constitutes an anti-friction device and facilitates the lateral shifting of the support upon which the bag carrying unit is mounted. The adjusting device for regulating the tension of the spring 153 preferably consists of an eye bolt 160 piercing the upstanding pin 155 and provided with a thumb screw 161 by means of which the spring may be readily adjusted to control the tension thereof. The spring 153 when at either side of the machine is under tension and as it is connected to the laterally shiftable support at the center thereof, it will move the same when the said laterally shiftable support is free to move. The horizontally swinging vertically pivoted lever 156 to which the outer end of the spring 153 is connected is adapted to be swung from one side of the machine to the other so as to set it in position for automatically shifting the bag support from one bag filling position to the other.

The centrally pivoted horizontally swinging lever 156 is connected to links 162 extending in opposite directions from a pivot 163 carried by the lever 156 and located adjacent to the inner end thereof. The links 162 extend to upper relatively short arms 164 of vertical rock shafts 165 which are provided with lower relatively long arms 166 which extend forwardly or outwardly from the said rock shafts at an angle, as clearly illustrated in Fig. 2 of the drawings. The rock shafts 165 and their arms 164 and 166 form bell crank or angle levers which extend into the path of the bag carrying units and which are successively operated by the said bag carrying units for shifting the lever and the spring from one side of the machine to the other.

The bag filling at the side at which the spring 153 is arranged and the arm 166 of the adjacent angle lever is located in the path of an upwardly extending lug or portion 167 of the adjacent bag carrying unit and when the bag at the side at which the spring is located is filled and the weighing frame is moved downwardly, the weight of the filled bag will disengage the spring catch 135 from the keeper lug 136 as soon as the bag carrying unit 91 has moved from behind the roller 159 through the lateral movement of the shiftable support 90 and the bag carrying unit having the full bag will move then outwardly to the position illustrated in Figs. 3 and 10 of the drawings. This outward movement of the bag carrying unit carries the lug 167 into engagement with the arm 166 and will move the arm 166 outwardly.

This will swing the arm 164 of such angle or bell crank lever inwardly and will carry the link 162 inwardly, thereby swinging the horizontal lever 156 to the opposite side of the machine and the tension of the spring will throw the laterally shiftable support towards the said other side of the machine thereby changing the bag carrying units from one filling position to the other.

As the main fixed catch 151 is out of engagement with the lugs 152 by reason of the downward movement of the weighing frame, the laterally shiftable frame is locked in such new position by one of a pair of auxiliary catches 168 consisting of approximately horizontal latch bars pivoted at their outer ends at 169 to the main frame and provided at their inner ends with depending engaging portions 170. The pivoted auxiliary latch bars are urged downwardly into position for engaging with the lugs 152 by means of bowed springs 171 connected with the latch bars and with the main frame. The inner terminals 172 of the pivoted latch bars are arranged in suitable guides 173 and the auxiliary latches are normally supported in an elevated position out of engagement with the lugs by beveled rods 174.

The beveled rods 174 are fixed to and project from the rear face of the body portions of the bag carrying units near the top thereof and are located beyond the side edges of the laterally shiftable support, as clearly illustrated in Figs. 13 to 16, inclusive of the drawings, and they are adapted to support the auxiliary catches 168 in an elevated position above the plane of the upper edges of the lugs, as clearly illustrated in Fig. 13. When one of the bag carrying units is moved outwardly through the action of the endless conveyor and the weight of the filled bag, its beveled rod 174 is carried away from the auxiliary catch and the auxiliary catch is permitted to drop into engagement with one of the lugs 152 as illustrated in Fig. 14 of the drawings. As soon as the bag receives its full charge and the weighing frame moves downwardly, it carries the lugs 152 downwardly and disengages one of them from the fixed main lug 151. This permits the spring to shift the laterally movable support to the position illustrated in Fig. 13 of the drawings, and will move the spout at the filled bag to the right, as shown in Fig. 6 of the drawings, and will bring the left hand spout in Fig. 6 of the drawings in alignment with the discharge outlet 28, causing the material to feed into the empty bag while the filled bag is being removed from the bag holder. The knife edge portion 132 of the adjacent side walls of the spouts avoids any obstruction of the flow of the material, which, after the one bag is filled will immediately flow into the spout communicating with the empty bag.

After the full bag is carried outwardly with the outward swinging of the bag carrying unit and the bag holder, the beveled rod or pin 174 is withdrawn from beneath one of the auxiliary catches and one of the said catches drops from the position shown in Fig. 13 to that illustrated in Fig. 14 and engages one of the lugs 152 and holds the laterally movable frame in its filling position until the weighing frame moves upwardly and re-engages one of the lugs 152 with the main fixed lug 151. This will prevent the laterally movable support from being swung to its other filling position when the spring 153 is swung from the position shown in Fig. 13 to the other side of the frame, in the position illustrated in Fig. 14 of the drawings. The spring is swung from the position shown in Fig. 13 to that illustrated in Fig. 14 by the outward swinging movement of the bag carrying unit 91 carrying its lug or projection 167 into engagement with the lower arm 166 of the adjacent bell crank or angle lever. The arm 166 being swung outwardly swings the upper arm 164 inwardly and moves the link 162 transversely of the machine, thereby swinging the horizontal lever 156 across the machine from the position illustrated in Fig. 2 of the drawings to the opposite side of the machine. The lever 156 carries with it the spring 153 which is tensioned at the side of the machine where the bag is being filled and placed in condition for the next automatic operation of the laterally movable support when the weighing frame again moves downwardly and permits the laterally movable support to be swung to the position illustrated in Fig. 16 of the drawings by the said spring 153. When the weighing frame moves downwardly through the action of the weight of the bag, the lugs 152 are carried downwardly below the plane of the lower edge of the catch 151, as illustrated in Fig. 15 of the drawings. In this position both of the auxiliary catches are supported by the beveled pins or rods 174 in an elevated position permitting the laterally movable support to be instantly shifted by the spring 153 to change the position of the spouts with relation to the discharge outlet as soon as the bag being filled receives its full weight of material. The continuous feed of the material is uninterrupted and continues to discharge into the bags. After the laterally movable support has been thus shifted, one of the auxiliary catches will be released by the outward movement of the bag carrying unit having the filled bag, and such auxiliary catch will engage with one of the lugs 152 of the laterally movable support and will retain the same in the bag filling position, discharging material into the empty bag until the weighing frame moves upwardly and re-engages the lug 152 with the lug 151, when the engagement of the main lug with one of the said lugs 152 will retain the mechanism in such bag filling position until the bag being filled receives its full weight and the weighing mechanism is returned to its initial position.

An empty bag is placed on the bag holder of the bag carrying unit from which the filled bag is removed, the weighing frame remaining in its lowered position until the said filled bag is entirely removed from the bag holder. After an empty bag has been placed on the bag holder the bag carrying unit is returned manually to its closed position, re-engaging the catch 135 with the keeper lug 136 and placing the clamp formed by the lever 138 in action and at the same time carrying the beveled pin or rod 174 into engagement with the auxiliary catch and returning the auxiliary catch to its elevated position.

It will thus be seen that the bag is filling at the side at which the spring 153 is arranged and is under tension. When the bag gets its full weight it moves the frame downward and carries one of the spaced lugs 152 out of engagement with the fixed lug of the main frame. Then the spring automatically moves the shiftable plate to the other side of the weighing frame. The frame remains down until the bag is entirely removed from the bag holder. The bag, having received its full weight, swings the bag carrying unit or member and the bag holder outwardly. The first portion of the outward movement of the bag support disengages the catch 135 and withdraws the beveled pin 174 and releases one of the auxiliary catches which engages one of the lugs of the support 90. Further outward movement of the bag carrier swings the spring to the other side of the frame and tensions it, but the shiftable plate is held by the auxiliary catch against movement by the said spring. Still further outward movement of the bag carrying unit lowers the bag until it comes in contact with the conveyor which removes the bag from the bag holder. At this point the frame moves upwardly and engages one of the spaced lugs 152 with the main lug 151. This is due to the removal of the weight of the full bag and the action of the weight of the weighing mechanism.

While the bag carrying unit is still out, an empty bag is placed on the bag holder. The bag carrying unit is then swung into place. This automatically re-engages the catch 135 with a keeper lug and puts the bag clamp into action to prevent the bag from slipping off the bag holder. The beveled pin is simultaneously moved into engagement with the auxiliary catch, lifting the same out of engagement with one of the spaced lugs 152 and leaving the laterally shiftable support to the automatic action of the spring for the next operation.

The laterally shiftable support is provided below the spouts 131 with openings 175 which communicate with an opening 176 of a suction trunk 177 located at the discharge outlet 28 of the lower rotary impeller. The discharge outlet of the lower rotary impeller extends through the suction trunk, as clearly illustrated in Fig. 11 of the drawings. This suction trunk extends across one side of the machine to a suction fan 178 which operates to remove the dust from around the discharge outlet and return the surplus material to the hopper. The suction fan is connected by a discharge pipe or conduit 179 with an auxiliary hopper 180 located within the main hopper at the upper portion thereof, as clearly illustrated in Fig. 1 of the drawings. The auxiliary hopper 180 is provided at the bottom with an outlet 181 which permits the material taken up by the suction fan to be deposited in the hopper without disturbing or agitating the contents thereof. The suction means removes the air from the bag being filled and prevents pressure from building up within the same and interfering with the bag filling operation, and the filling capacity of the machine is thereby materially increased.

The shaft 182 of the suction fan extends exteriorly of the fan casing and is connected with the upper shaft 48 by a belt 183 arranged on the pulleys 184 and 185a mounted on the said shafts 48 and 182 respectively. Any other suitable means may be employed for driving the suction fan, which is continuously operated while the motor is running and which cooperates with the lower rotary impeller to clear the same of material when the clutch is operated to unclutch the upper rotary impeller and the agitators of the hopper.

The bag filling machine is equipped with a vibratory scraper 185 consisting of a horizontal rod slidably mounted in the suction trunk and provided with depending blades 186, 187 and 188 and approximately L-shaped arms 189 located at opposite sides of the laterally movable support, as clearly illustrated in Fig. 18 of the drawings, and arranged to be engaged by the said laterally movable support, which vibrates the scraper for causing any accumulation of material to drop into the suction trunk. The arms 187 and 188 depend at opposite sides of the discharge outlet and the arm 186 is located at one side of the said outlet, as clearly shown in Fig. 18 of the drawings. The scraper will prevent any accumulation of material at the openings 175 and 176.

In Figs. 24 and 25 of the drawings is illustrated a modification of the invention, in which is shown an electrically operated main catch or locking means for holding the laterally movable support in its bag filling positions. The laterally movable support 190 is provided with spaced sockets 191 which are adapted to be alternately engaged by a spring actuated locking pin 192 mounted in suitable guides 193 and 194 and adapted to be maintained in engagement with the laterally shiftable support by a coiled spring 195 disposed on the catch and interposed between the guide 194 and a collar or pin 196 mounted on the catch and located between the guides 193 and 194. The catch 192, which consists of a pin or rod is provided at its inner end with an armature 197 which is attracted by an electromagnet 198 to withdraw the spring actuated catch from engagement with the laterally shiftable support when a bag has received its full weight and the weighing frame 199 moves downwardly to permit the laterally shiftable frame 190 to be automatically shifted by a coiled spring 200 to change the laterally shiftable support from one bag filling position to the other. The spring 200 is constructed, arranged and operated similar to the spring 153 heretofore described, and with the exception of the main spring actuated catch or locking pin 192 and the electrically operated means for controlling the same, the construction of the bag filling machine is identically the same as that heretofore described.

The electromagnet is arranged in circuit with a mercury switch 201 pivotally supported at 202 and connected by a link 203 with one end of a lever 204 fulcrumed at its other end at 205 to a hanger member 206 or other suitable support and connected with the scale beam 207 by an arm 208 pivotally connected with the lever 204 at a point intermediate of the ends thereof by a suitable pivot 209.

The tiltable mercury switch 201 controls the circuit 210 in which the electromagnet 198 is arranged, and when the weighing frame moves downwardly the rear arm of the scale beam moves upwardly and swings the lever 204 upwardly and tilts the mercury switch 201 to close the circuit and energize the electromagnet 198 and withdraw the spring actuated pin or catch from engagement with the laterally shiftable support to permit the automatic shifting of the same by the spring 200. When the weighing frame moves upwardly the mercury switch is tilted in the opposite direction and the circuit is broken to deenergize the electromagnet 198 and permit the spring actuated catch to re-engage the laterally shiftable support. As the rest of the construction of the machine of the modification is the same as that heretofore described, further illustration and description of the modified form of the invention is unnecessary.

What is claimed is:

1. A bag filling machine of the class described, including bag filling mechanism and means for supporting a bag in filling position and for moving the same forwardly to a position in spaced relation to the filling means and downwardly to lower the bag when the bag is filled, a continuously moving endless conveyor provided with a frame and normally located below and spaced from the bag on said supporting means and receiving a filled bag when the same is lowered for carrying the filled bag outwardly from the bag filling mechanism and stripping the bag from the bag supporting means, and means for adjustably supporting the conveyor frame for arranging the endless conveyor at different elevations to suit the length of the bags being filled.

2. A bag filling machine of the class described, including a rotary impeller having a discharge opening having a uniform predetermined cross-section, and a laterally shiftable support provided with outwardly diverging spouts arranged to be carried alternately into register with the outlet of the said impeller by the shifting of the said support, said spouts having their adjacent walls forming a knife edge movable across the discharge opening whereby the flow of material through the outlet into the spouts will be uninterrupted by the shifting of the said spouts.

3. A bag filling machine of the class described, including a main frame, a vertically movable weighing frame, upper and lower longitudinal links pivotally connected with the main frame and the weighing frame, upper and lower reversely arranged transverse links pivotally connected at their outer ends to the main frame and extending across the weighing frame to the opposite sides thereof and pivoted to the same, a laterally shiftable support pivotally mounted on the weighing frame, and bag carrying units mounted on the laterally shiftable support.

4. A bag filling machine of the class described, including a main frame, a vertically movable weighing frame, a laterally shiftable support pivotally mounted on and carried by the weighing frame, bag carrying units pivotally mounted on the support and arranged to swing forwardly and rearwardly from and to the same, coacting locking means on the main frame and the laterally shiftable support for holding the same against lateral movement when the weighing frame is at the limit of its upward movement and automatically disengaged when the weighing frame moves downwardly, and means including a spring connected with the laterally movable support for automatically shifting the said support when the weighing frame moves downwardly and carries the coacting locking means out of engagement, and means automatically operated by the bag carrying units for changing the spring from one side of the machine to the other.

5. A bag filling machine of the class described, including a main frame, a vertically movable weighing frame, a laterally shiftable support pivotally mounted on and carried by the weighing frame, bag supporting units pivotally mounted on the laterally shiftable support and arranged to swing forwardly and rearwardly from and to the same, coacting locking means on the main frame and the laterally shiftable support for holding the same against lateral movement when the weighing frame is at the limit of its upward movement and automatically disengaged when the weighing frame moves downwardly, means including a spring connected with the laterally movable support for automatically shifting the said support when the weighing frame moves downwardly and carries the coacting locking means out of engagement, automatically operating locking means for retaining the said support in its shifted position, and means automatically operated by the bag supporting units for changing the spring from one side of the machine to the other.

6. A bag filling machine of the class described, including a main frame, a vertically movable weighing frame, a laterally shiftable support pivotally mounted on and carried by the weighing frame, bag carrying units pivotally mounted on the laterally shiftable support and arranged to swing forwardly and rearwardly from and to the same, coacting locking means on the main frame and the laterally shiftable support for holding the same against lateral movement when the weighing frame is at the limit of its upward movement and automatically disengaged when the weighing frame moves downwardly, a spring connected with the laterally movable support for automatically shifting the said support when the weighing frame moves downwardly and carries the coacting locking means out of engagement, automatically operating locking means for retaining the said support in its shifted position, and means actuated by the bag carrying units for automatically transferring the spring from one side of the machine to the other, whereby the laterally movable support will be automatically shifted in the next downward movement of the weighing frame.

7. A bag filling machine of the class described, including a vertically movable weighing frame, a laterally shiftable support carried by the weighing frame, bag carrying units mounted on the said support and movable forwardly and rearwardly with respect to the laterally shiftable support and actuated in their outward movement by the weight of a filled bag, means for locking the support against movement when the weighing frame is raised and for releasing the support when the weighing frame moves downwardly, a spring connected with the support for automatically shifting the same when the weighing frame moves downwardly, and mechanism actuated by the forward movement of the bag carrying units for transferring the spring from one side of the support to the other for shifting the support in the next downward movement of the weighing frame.

8. A bag filling machine of the class described, including a vertically movable weighing frame, a laterally shiftable support carried by the weighing frame, bag carrying units pivotally mounted on the said support and movable forwardly and rearwardly with respect to the shiftable support and actuated in their forward movement by the weight of a filled bag, means for locking the support against movement when the weighing frame is raised and for releasing the support when the weighing frame moves downwardly, a spring connected with the support for automatically shifting the same when the weighing frame moves downwardly, auxiliary locking means for holding the support after the same has been shifted by the said spring, and mechanism actuated by the forward movement of the bag carrying units for transferring the spring from one side of the support to the other for shifting the support in the next downward movement of the weighing frame.

9. A bag filling machine of the class described, including a vertically movable weighing frame, a laterally shiftable support carried by the weighing frame, bag carrying units pivotally mounted on the said support and movable forwardly and rearwardly with respect to the shiftable support and actuated in their forward movement by the weight of a filled bag, means for locking the support against movement when the weighing frame is raised and for releasing the support when the weighing frame moves downwardly, a spring connected with the support for automatically shifting the same when the weighing frame moves downwardly, and mechanism actuated by the forward movement of the bag carrying units for transferring the spring from one side of the support to the other for shifting the support in the next downward movement of the weighing frame, said mechanism comprising a horizontally swinging lever connected to the said spring, and angle levers connected with the horizontally swinging lever and having arms arranged to be engaged and actuated by the outward movement of the bag carrying units.

10. A bag filling machine of the class described, including a vertically movable weighing frame, a laterally shiftable support carried by the weighing frame, bag carrying units pivotally mounted on the said support and movable forwardly and rearwardly with respect to the shiftable support and actuated in their forward movement by the weight of a filled bag, means for locking the support against movement when the weighing frame is raised and for releasing the support when the weighing frame moves downwardly, a spring connected with the support for automatically shifting the same when the weighing frame moves downwardly, and mechanism actuated by the forward movement of the bag carrying units for transferring the spring from one side of the support to the other for shifting the support in the next downward movement of the weighing frame, said mechanism comprising a horizontally swinging lever connected with the said spring, opposite bell crank levers having angularly related arms and arranged to be engaged by the bag carrying units and actuated by the same in the forward movement thereof, and links connecting the bell crank levers with the horizontally swinging levers.

11. A bag filling machine of the class described, including a continuously moving endless carrier, a vertically movable weighing frame, a laterally shiftable support carried by the weighing frame, and bag carrying units hinged to the support adjacent the bottom of the machine and arranged to swing outwardly and inwardly with respect to the shiftable support and provided with relatively fixed projecting bag supporting bag holders located above the endless carrier and normally supporting a bag out of contact with the endless carrier and adapted to carry the bag holders away from and in a position in spaced relation to the support and lower a filled bag upon the said continuously moving endless carrier when a bag carrying unit swings outwardly, whereby the bag will be automatically stripped from the bag holders and removed from the bag holder by the endless carrier.

12. A bag filling machine of the class described, including a continuously moving endless carrier, a vertically movable weighing frame, a laterally shiftable support carried by the weighing frame, bag carrying units hinged to the support adjacent the bottom of the machine and arranged to swing outwardly and inwardly with respect to the shiftable support and provided with relatively fixed projecting bag holders located above the endless carrier and normally supporting a bag out of contact with the endless carrier and adapted to carry the bag holders away from and in a position in spaced relation to the support and lower a filled bag upon the said continuously moving endless carrier when a bag carrying unit swings outwardly, whereby the bag will be automatically stripped from the bag holder by the endless carrier, and catches for holding the bag carrying units against outward movement automatically releasable by the weight of a filled bag.

13. A bag filling machine of the class described, including an endless carrier, a vertically movable weighing frame, a laterally shiftable support carried by the weighing frame, bag carrying units hinged to the support and arranged to swing outwardly and inwardly relative to the shiftable support and provided with relatively fixed projecting bag holders located above the endless carrier and normally supporting a bag out of contact with the endless carrier and adapted to lower a filled bag upon the said endless carrier when a bag carrying unit swings outwardly, whereby the bag will be automatically stripped from the bag holder by the endless carrier, and levers mounted on the bag carrying units and provided with catches for normally holding the said units against outward movement and automatically releasable by the weight of a filled bag, said levers being provided with bag engaging clamps for retaining a bag on the bag holders while the bag is being filled.

14. A bag filling machine of the class described, including a vertically movable weighing frame, a laterally shiftable support carried by the weighing frame and provided with spaced keepers, bag carrying units hinged to the laterally movable support adjacent the bottom of the machine and arranged to swing outwardly and inwardly and provided with relatively fixed forwardly projecting bag holders which are carried to a position in advance of and spaced from the support when the bag carrying units swing outwardly, levers located above the bag holders and having spring catches for yieldingly engaging the said keepers and provided with clamping means for retaining a bag on the bag holders and placed under tension by the engagement of the catches with the said keepers, the weight of the filled bag being sufficient to withdraw the yieldable catch from engagement with the coacting keeper and thereby release the bag carrying unit and at the same time relieve the bag clamping means of the pressure produced by the engagement of the spring catch with the keeper.

15. A bag filling machine of the class described, including a vertically movable weighing frame, a laterally shiftable support mounted on the weighing frame, bag carrying units provided at the bottom with hinge connections arranged at an angle to each other to permit the said bag carrying units to swing inwardly and outwardly and upwardly and downwardly, said bag carrying units being provided with relatively fixed projecting bag holders, means for normally holding the bag carrying units against outward movement and releasable solely by the weight of a filled bag, and conveying means located below the bag holders and normally out of contact with the bags supported by the same and adapted when a filled bag is lowered by the downward movement of the weighing frame and is swung outwardly and downwardly by a bag carrying unit to strip the filled bag from its bag holder automatically.

16. A bag filling machine of the class described, including a vertically movable weighing frame, a laterally shiftable support mounted on the weighing frame, bag carrying units hinged to the support and arranged to swing inwardly and outwardly, means for normally holding the bag carrying units against outward movement and releasable by the weight of a filled bag, and relatively fixed guiding means for guiding the bag carrying units in their inward and outward movement, said guiding means extending outwardly from the machine and provided at their outer portions with means for cushioning the outward movement of the bag carrying units.

17. A bag filling machine of the class described, including a continuously moving endless carrier, a vertically movable weighing frame, a laterally shiftable support mounted on the weighing frame, bag carrying units having relatively fixed projecting bag supports, said bag carrying units being hinged to the support adjacent the bottom of the machine and arranged to swing inwardly and outwardly and upwardly and downwardly and adapted in their outward movement to carry a filled bag forwardly to a position in advance of its filling position and lower the filled bag automatically upon the said continuously moving endless carrier, said bag supports normally holding the bags above and out of contact with the endless carrier and the latter being adapted to automatically strip filled bags from the bag holders when the bags are lowered, and operating arms connected with the bag carrying units for enabling the same to be manually moved inwardly.

18. A bag filling machine of the class described, including a main frame, a vertically movable weighing frame, a laterally shiftable support mounted on the weighing frame, hinged bag carrying units mounted on the said support and arranged to move inwardly and outwardly to and from the said support, coacting locking means on the main frame and the said support for holding the support against lateral movement when the weighing frame is at the limit of its upward movement and automatically releasable when the weighing frame moves downwardly, a spring connected with the laterally movable support for automatically shifting the support when the weighing frame moves downwardly, auxiliary locking means normally maintained in an inoperative position by the bag carrying units and released by the outward movement of the bag carrying units for locking the support against movement after the same has been shifted by the said spring, means automatically operated by the outward movement of the bag carrying units for transferring the spring from one side of the machine to the other to arrange the same for automatically shifting the support in the next downward movement of the weighing frame, and means carried by the units for automatically disengaging the auxiliary locking means after the weighing frame has moved upwardly.

19. A bag filling machine of the class described, including a main frame, a vertically movable weighing frame, a laterally shiftable support mounted on the weighing frame, hinged bag carrying units mounted on the said support and arranged to move inwardly and outwardly to and from the said support, coacting locking means on the main frame and the said support for holding the support against lateral movement when the weighing frame is at the limit of its upward movement and automatically releasable when the weighing frame moves downwardly, a spring connected with the laterally movable support for automatically shifting the support when the weighing frame moves downwardly, auxiliary locking means normally maintained in an inoperative position by the bag carrying units and released by the outward movement of the bag carrying units for locking the support against movement after the same has been shifted by the said spring, means automatically operated by the outward movement of the bag carrying units for transferring the spring from one side of the machine to the other to arrange the same for automatically shifting the support in the next downward movement of the weighing frame, and rearwardly projecting pins carried by the said units and arranged to lift the auxiliary locking means out of engagement when the bag carrying units are moved inwardly to their normal or closed position.

20. A bag filling machine of the class described, including a main frame, a vertically movable weighing frame, a laterally shiftable support mounted on the weighing frame, a main fixed lug mounted on the main frame, spaced lugs carried by the laterally movable support and engageable with the said main lug to hold the support against lateral movement when the weighing frame moves upwardly, auxiliary latches mounted on the main frame and arranged to engage the said spaced lugs for holding the support against movement when the weighing frame has moved downwardly and the support has been automatically shifted, means for automatically shifting the support when the said lugs are disengaged by the downward movement of the weighing frame, and bag carrying units hinged to the said support and provided with rearwardly projecting pins arranged to engage the auxiliary latches for normally supporting the same out of engagement with the spaced lugs and for disengaging the auxiliary latches when a bag carrying unit is moved inwardly to its normal or closed position.

21. A bag filling machine of the class described, including a vertically movable weighing frame, a laterally shiftable support mounted on the weighing frame, bag carrying units hinged to the weighing frame and arranged to swing outwardly and inwardly, and a centrally arranged rotary stop wheel carried by the weighing frame and arranged to alternately engage with the bag carrying units and forming a stop for the engaged unit to prevent outward swinging of the same, said rotary stop wheel being arranged to constitute an anti-friction device to facilitate the movement of the shiftable support and the said bag carrying units being carried into and out of engagement with the rotary stop wheel solely by the lateral shifting movement of the said support.

22. A bag filling machine of the class described, including a vertically movable weighing frame, a laterally shiftable support mounted on the weighing frame, bag carrying units hinged to the support and arranged to swing outwardly and inwardly, a horizontally swinging lever pivotally mounted on the weighing frame, a spring connected with the lever and with the support and adapted to shift the said support, means for automatically operating the lever to swing the same and the spring from one side to the weighing frame to the other, and a stop consisting of a wheel mounted for rotary movement on the pivot of the lever and arranged in spaced relation with the support, said support alternately moving the bag carrying units into engagement with the said wheel to form a stop for the engaged bag carrying unit, and said rotary stop wheel being arranged to constitute an anti-friction device to facilitate the movements of the shiftable frame.

23. A bag filling machine of the class described, including a vertically movable weighing frame, a laterally shiftable support mounted on the weighing frame, bag carrying units hinged to the support and arranged to swing outwardly and inwardly, spring catches carried by the bag carrying units and engageable with portions of the shiftable support for normally holding the bag carrying units against outward movement and releasable by the weight of a filled bag, and a stop carried by the weighing frame and arranged in spaced relation with the support, the latter alternately moving the bag carrying units into and out of engagement with the stop for positively holding the bag carrying unit engaged by the stop against outward movement.

24. A bag filling machine of the class described including feeding mechanism having an outlet having a uniform predetermined cross-section for the material, and a laterally shiftable support provided with a pair of spouts adapted to be carried alternately into register with the outlet of the feeding mechanism by the shifting of the said support, said spouts having their adjacent walls forming a knife edge movable across the outlet, whereby the flow of material through the outlet into the spouts will be uninterrupted by the shifting of the spouts.

25. A bag filling machine of the class described including a rotary impeller having an outlet having a uniform predetermined cross-section for the material, and a laterally shiftable support provided with a pair of spouts arranged to be carried alternately into register with the outlet of the impeller by the shifting of the support, said spouts having their adjacent walls forming a knife edge movable across the outlet, whereby the flow of material through the outlet into the spouts will be uninterrupted by the shifting of the spouts.

26. A bag filling machine of the class described including bag filling mechanism, means for supporting a bag in filling position and for moving the bag forwardly to a position in spaced relation to the filling means and downwardly to lower the bag when the bag is filled, and a continuously moving endless conveyor normally located below and spaced from the bag on said bag supporting means and arranged to receive a filled bag when the same is lowered and adapted to carry the filled bag outwardly from the bag filling mechanism and strip the bag from the bag supporting means.

27. A bag filling machine of the class described including a vertically movable weighing frame, an upright support pivoted at the lower end to the weighing frame and shiftable laterally and provided at its upper portion with discharge spouts, bag carrying units hinged to the said support and arranged side by side in substantial parallelism and adapted to swing forwardly and rearwardly toward and from the said spouts and provided with approximately semi-tubular bag holders arranged to fit over the spouts when the said units are at the limit of their inward movement to form with the spouts a tubular discharge structure.

28. A bag filling machine of the class described including a vertically movable weighing frame, an upright support pivoted at the lower end to the weighing frame and shiftable laterally and provided at its upper portion with discharge spouts, bag carrying units hinged to the said support and arranged side by side in substantial parallelism and adapted to swing forwardly and rearwardly toward and from the said spouts and provided with approximately semi-tubular bag holders arranged to fit over the spouts when the said units are at the limit of their inward movement to form with the spouts a tubular discharge structure, said bag holders being tapered outwardly and provided at their outer ends with projecting longitudinal rods adapted to be inserted in a valved opening of the bag.

WILLIAM D. WRIGHT.